US008423900B2

(12) United States Patent
Fillion et al.

(10) Patent No.: US 8,423,900 B2
(45) Date of Patent: Apr. 16, 2013

(54) OBJECT BASED ADAPTIVE DOCUMENT RESIZING

(75) Inventors: Claude S. Fillion, Rochester, NY (US); Vishal Monga, Webster, NY (US); Zhigang Fan, Webster, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 487 days.

(21) Appl. No.: 12/544,561

(22) Filed: Aug. 20, 2009

(65) Prior Publication Data

US 2011/0047505 A1 Feb. 24, 2011

(51) Int. Cl.
*G06F 3/00* (2006.01)
*G06F 3/14* (2006.01)

(52) U.S. Cl.
USPC ........... 715/788; 715/765; 715/800; 715/866; 715/243; 715/252

(58) Field of Classification Search .................. 715/733, 715/744, 760, 764, 765, 781, 788, 800, 866, 715/254, 256, 200, 243, 252
See application file for complete search history.

(56) References Cited

U.S. PATENT DOCUMENTS

| | | | |
|---|---|---|---|
| 6,345,279 B1 * | 2/2002 | Li et al. ................................. 1/1 |
| 8,108,801 B2 * | 1/2012 | Craig et al. ..................... 715/864 |
| 2001/0011364 A1 * | 8/2001 | Stoub ................................ 717/1 |
| 2004/0004641 A1 | 1/2004 | Gargi |
| 2006/0103667 A1 * | 5/2006 | Amit et al. ..................... 345/619 |
| 2006/0195784 A1 * | 8/2006 | Koivisto et al. ................ 715/523 |
| 2006/0200779 A1 * | 9/2006 | Taylor ............................ 715/781 |
| 2007/0279648 A1 * | 12/2007 | Quach et al. ................... 358/1.2 |
| 2008/0062438 A1 * | 3/2008 | Lin et al. ........................ 358/1.2 |
| 2008/0270890 A1 * | 10/2008 | Stern .............................. 715/239 |
| 2009/0033999 A1 * | 2/2009 | Nishiyama ................... 358/1.18 |
| 2009/0303253 A1 * | 12/2009 | Flake et al. .................... 345/660 |
| 2010/0017435 A1 * | 1/2010 | Anno ......................... 707/103 R |
| 2010/0180213 A1 * | 7/2010 | Karageorgos et al. ........ 715/753 |
| 2010/0218089 A1 * | 8/2010 | Chao et al. .................... 715/246 |

OTHER PUBLICATIONS

Avidan, et al., "Seam Carving for Content-Aware Image Resizing," *ACM Transactions on Graphics (TOG)*, Jul. 2007, 9 pages, vol. 26, Issue 3, ISSN: 0730-0301.
Fillion, et al., "Hybrid Importance Maps for Content Aware Digital Image Resizing," U.S. Appl. No. 12/174,767, filed Jul. 17, 2008.

(Continued)

*Primary Examiner* — Xiomar L Bautista
(74) *Attorney, Agent, or Firm* — Philip E. Blair; Fleit Gibbons Gutman Bongini & Bianco P.L.

(57) ABSTRACT

What is disclosed is a resizing method that utilizes segmentation information to classify objects found within a document and then selects the most appropriate resizing technique for each identified object. The present method employs readily available document parsers to reliably extract objects. e.g. text, background, images, graphics, etc., which compose the document. Information obtained from a document parser is utilized to identify the document components for classification. The extracted objects are then classified according to their object type. Each of classified objects are then resized using a resizing technique having been pre-selected for the object type based on their respective abilities to resize certain types of document content over other resizing techniques. The present method advantageously extends smart or content-based scaling and is especially useful for N-up or variable-information printing. The present method finds its intended uses in enhancing N-up and handout options currently provided in a variety of print-drivers.

9 Claims, 6 Drawing Sheets

OTHER PUBLICATIONS

Fillion, et al., "Iterative Selection of Pixel Paths for Content Aware Image Resizing," U.S. Appl. No. 12/330,879, filed Dec. 9, 2008.

Fillion, et al., "Resizing a Digital Document Image Via Background Content Removal," U.S. Appl. No. 12/369,790, filed Feb. 12, 2009.

European Search Report for Application No. 10173171.9 dated Dec. 13, 2010.

Ma et al, "A Framework for Adaptive Content Delivery in Heterogeneous Network Environments", [Online] Jan. 24, 2000, XP002168331, Retrieved from the Internet: URL: http://www.cooltown.hp.com/papers/adcon/MMCN2000 [retrieved on May 28, 2001].

Han et al, "Dynamic Adaptation in an Image Transcoding Proxy for Mobile Web Browsing", Dec. 1, 1998, IEEE Personal Communications, pp. 8-17, XP000790121, ISSN: 1070-9916.

Mohan et al, "Adapting Multimedia Internet Content for Universal Access", IEEE Transactions on Multimedia, pp. 104-114, vol. 1, No. 1, Mar. 1999, XP011036278, ISSN: 1520-9210.

Chen et al, "Detecting Web Page Structure for Adaptive Viewing on Small Form Factor Devices", [online], May 20, 2003, XP002312703, http://research.microsoft.com/asia/dload_files/group/system/p297-chen.pd. [retrieved on Jan. 7, 2005].

\* cited by examiner

OBJECT BASED ADAPTIVE DOCUMENT RESIZING

TECHNICAL FIELD

The present invention is directed to content-based document resizing methods generally employed in a document processing workstation.

BACKGROUND

Digital documents often need to be resized to fit the device whereon the document image is intended to be displayed to the user, such as a mobile phone, camera, PDA, monitors, printers, and the like. Document images can be resized by a cropping or scaling technique which treat the document as a single, opaque object. Cropping works reasonably well for shrinking images if there is only one region of interest in the document intended to be resized. Naïve cropping can be problematic because important contextual information may be removed from the document. Scaling works reasonably well for shrinking images containing low frequency information. However, scaling can be of limited value because scaling tends to be uniformly applied to the overall image resulting in information loss. With proper region identification, cropping may be preferred over naïve scaling.

Content-aware resizing techniques have been developed owing to the inherent limitations of classical scaling and cropping-based resizing methods. Given that many widely employed document formats, such as PDF and WORD, enable the composition of documents incorporating various different objects such as images, text, graphics, and the like, treating a document page as a flattened raster image is inherently limiting from a resizing standpoint. Because document parsers are often an essential software component in features such as object-optimized color rendering, a framework for resizing that employs customized algorithmic approaches based on the various object types contained within a document is desirable.

Accordingly, what is needed in this art are document resizing methods that utilize segmentation information obtained from the document itself to selectively resize objects within the document using the most appropriate technique for each identified object.

BRIEF SUMMARY

What is disclosed is a novel document resizing method that utilizes segmentation information to classify the various objects found within a given document page and then, based upon the classification, selects the most appropriate resizing technique for each identified object. The present method employs readily available document parsers to reliably extract objects, e.g. text, background, images, graphics, etc., which compose the document. Information obtained from the document parser used to extract the objects is utilized to identify the document components for classification. The extracted objects are then classified according to their object type. Each classified object is resized using a resizing technique having been pre-selected for the object type based upon their respective abilities to resize certain types of document content over the various other resizing techniques. The present method advantageously extends smart or content-based scaling and is especially useful for N-up or variable-information printing. The present method finds its intended uses in enhancing N-up and handout options currently provided in a variety of print drivers.

In one example embodiment, the present method for object-based document reduction includes receiving a multi-page document. For each page of the multi-page document, target specifications for target size and output device resolution are received. The document page is parsed using a software document page parser. Information obtained from said document page parser is utilized to identify objects contained within said document page and the identified objects are classified by object type. For each object within said document page, the object is extracted from the document page and a reduction method is selected for said extracted object based upon its object type and using said target specifications. The selected reduction method is applied to the extracted object to produce a respective resized extracted object. A new document page is constructed using the resized extracted objects and the new document page is provided to an output device for rendering.

Embodiments are provided that select reduction methods by prioritizing reduction of the extracted object based upon a rule-based set of guidelines and target specifications for target size and output device resolution. Further embodiments are provided that use local and global context of the document to target different sizes of objects for reduction.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
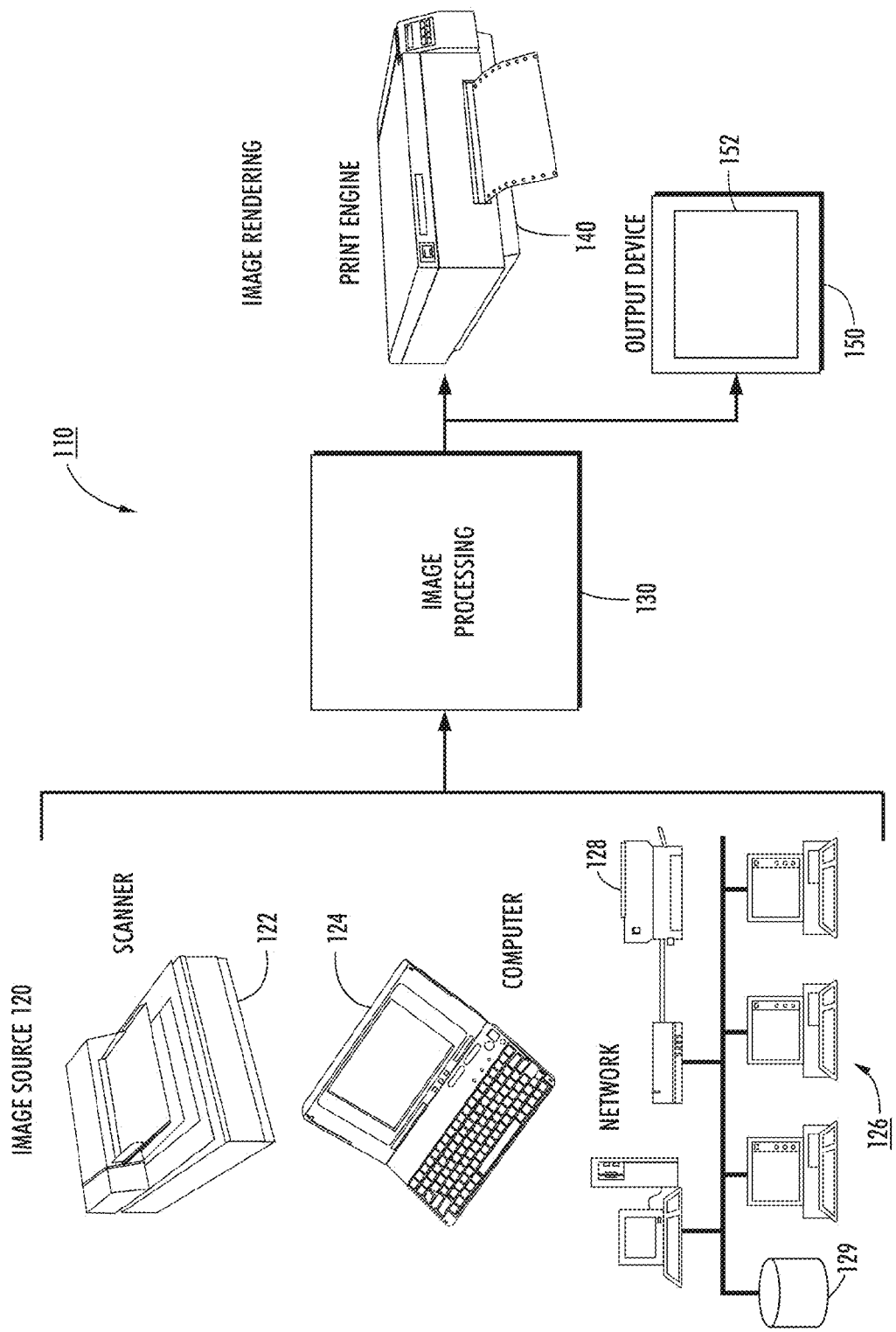
FIG. 1 illustrates an example of a digital imaging system suitable for one or more aspects of the present object-based adaptive document resizing method.

What is provided are a system and method for object-based adaptive document resizing that utilizes segmentation information to resize document components using the most appropriate method for each component.

It should be understood that one of ordinary skill in this art should be readily familiar with the document processing techniques, particularly those which relate to document parsing to identify and classify object content contained within a page, and also techniques employed to segment documents which are in rasterized form and to resize image objects of various types. One of ordinary skill would also be knowledgeable about computer science, and software and hardware programming systems and methods sufficient to implement the functionality and capabilities described herein in their own document system environments without undue experimentation.

Definitions

An "image", as used herein, refers to a pattern of physical light comprised of known colors of the light spectrum which are visible by the human eye. When reduced to print, the image generally comprises a plurality of colored pixels arrayed on a media substrate or a display device. An image print would be a photograph, plot, chart, graphic, and the like, as are generally known. When an image is rendered to a memory or storage device, values of the pixels are stored in any of a variety of formats such as BMP, JPG, GIF, TIFF, or other formats employed for storing image data.

"Target Specifications" refers to specifications for a desired output of a document to be resized. Target specifications include a size of the reduced document, a resolution of the image output device, and the like. The term is intended to include any other information needed to obtain the desired output produced by an application of the present document resizing method.

"Extracting an object" refers to isolating an object within a given page sufficient to allow processing of the object in accordance with various aspects of the present method.

"Applying a reduction method" refers to processing an object to obtain a resized representation thereof in accordance with the target specifications.

"Constructing a new document page" refers to assembling the resized objects into a page which substantially conforms to the target specifications.

An "image processing system" refers to a hardware or software system capable of processing the received multipage document in accordance with one or more aspects of the present document reduction method. The image processing system generally resides in the image path of a digital document system and may further incorporate various aspects of a color management system. Various embodiments of the present document resizing method are directed towards the image processing system. In a first end of the image path, a signal of the image to be resized is received, such as pixels or data structures, one or more operations such as content identification, object extraction, resizing, and other operations as described more fully herein, are performed on the received image data, and a signal of the processed image is provided to one or more image output devices whereon the signal is reduced to a viewable form by, for example, the application of colored inks onto a media substrate.

An "image input device" is a device capable of receiving or otherwise obtaining a digital image of a page of a document and providing the received image data to the image processing system. The set of image input devices is intended to encompass a wide variety of document capture devices including cameras, photography equipment, facsimile machines, photo reproduction equipment, and other image capturing devices. A scanner is one such capture device that optically scans a document and converts the scanned image into a digitized form. Common scanning devices include variations of the flatbed scanner, as is generally known in the arts, wherein specialized receptors move beneath a platen and scan the document on the device's platen. Modern digital scanners typically incorporate a charge-coupled device (CCD) or a contact image sensor (CIS) as the image sensing receptor(s). A signal of the image data is produced by the image input device. Such a signal contains information about the received image such as pixel color value, color intensity, pixel location, and the like.

An "image output device" is any device capable of rendering the image data. The set of image output devices includes digital document reproduction equipment and other xerographic copier systems as are widely known in commerce, photographic production and reproduction equipment, monitors and other displays, computer workstations and servers, including a wide variety of color marking devices, and the like, as are generally known in the arts. An image output device may incorporate some or all of the functionality of an image input device. Rendering of the image data is also intended to include storing the image data to a storage device or a memory, or communicating a signal of the image data to another device such as a workstation or server over a network such as the Internet, LAN, etc.

One embodiment of the present method uses a comprehensive view of document reduction in which objects of a document are identified and those objects are then able to each be reduced in size using techniques appropriate for the class of that object. For example, text objects could be resized by using a different font size; graphics objects could be resized using isomorphic scaling; image objects could be resized using content aware resizing; and whitespace/background of the document could be resized using standard background removal techniques. In general, the present object-based adaptive document resizing method is able to incorporate any resizing technique useful for a particular type of object classification. Further aspects of the present method include developing a set of rules to establish guidelines for details such as priority of object resizing and relative resizing amounts of objects based upon object characteristics, such as relative size.

One embodiment of the present method prioritizes application of resizing techniques to objects based upon various criteria. In one embodiment, a target specification is received that specifies, for example, an amount of reduction to be applied to a document or page and/or a display resolution for the document or page. Based upon the received target specification, a goal for the amount of size reduction for the document or page is determined. An amount of reduction to be applied to each identified object in the document or page is then adaptively determined based upon predetermined criteria.

An example of criteria used to adaptively determine an amount of reduction to be applied to a particular image object within a document or page is image object complexity. For example, images may be assumed to be more complex components of a document than are text portions. Reducing the size of a complex image will have a more adverse impact than reducing text by the same amount. An example of reduction priority is to reduce the size of more complex image objects, such as complex graphics, by less than a reduction of size that is applied to less complex objects, such as text or background patterns.

One Example Image Processing Environment

Reference is now made to FIG. 1, which illustrates one example embodiment of a generic digital imaging system wherein one or more aspects of the present document resizing method are likely to find their intended uses.

In the example digital imaging system 110, image input device 120 is used to produce image data that is supplied to image processor 130 that produces output data for rendering by print engine 140 or other image output device 150. Image input device 120 may include document scanner 122, computer 124, network 126, or other similar or equivalent image input device. On the output end, print engine 140 can be any type of xerographic engine used to render a signal of an image into a viewable form, or equivalent print technology alternatives as wax, ink jet, etc. Image output device 150 includes any type of display device 152, such as an LCD based graphical display, alternative hardcopy production device, and the like.

The teachings presented herein are directed toward aspects of the image processor depicted in FIG. 1. In particular, the intention is to reduce the size of a document produced by an image input device or that is contained in any suitable electronic format. It will be appreciated by those skilled in the art that the rendering of the resized document image may be accomplished at any of a number of locations, which is shown in FIG. 1 as occurring within print engine or image output device.

Many applications of the present document resizing method are envisioned. For instance, a document that was created to be produced on a letter size page or standard computer display may be reduced to be more effectively displayed on image output device with a different display screen, such as for example, the display of a Personal Digital Assistant (PDA), the display of a cellular telephonic device, or any display which is smaller than the originally intended display. Further, the document may be directed (or re-directed) to be rendered on different sized paper, and may be redesigned with different layout requirements thereby requiring resizing of its various object content. In one example, a user may wish to resize pages of a document so that two or more original pages are able to be printed on a single output page. A user may further wish to modify one or more of the attributes of an object such as size, or aspect ratio prior to rendering by the image output device.

Example Flow Diagrams

Figure 2:
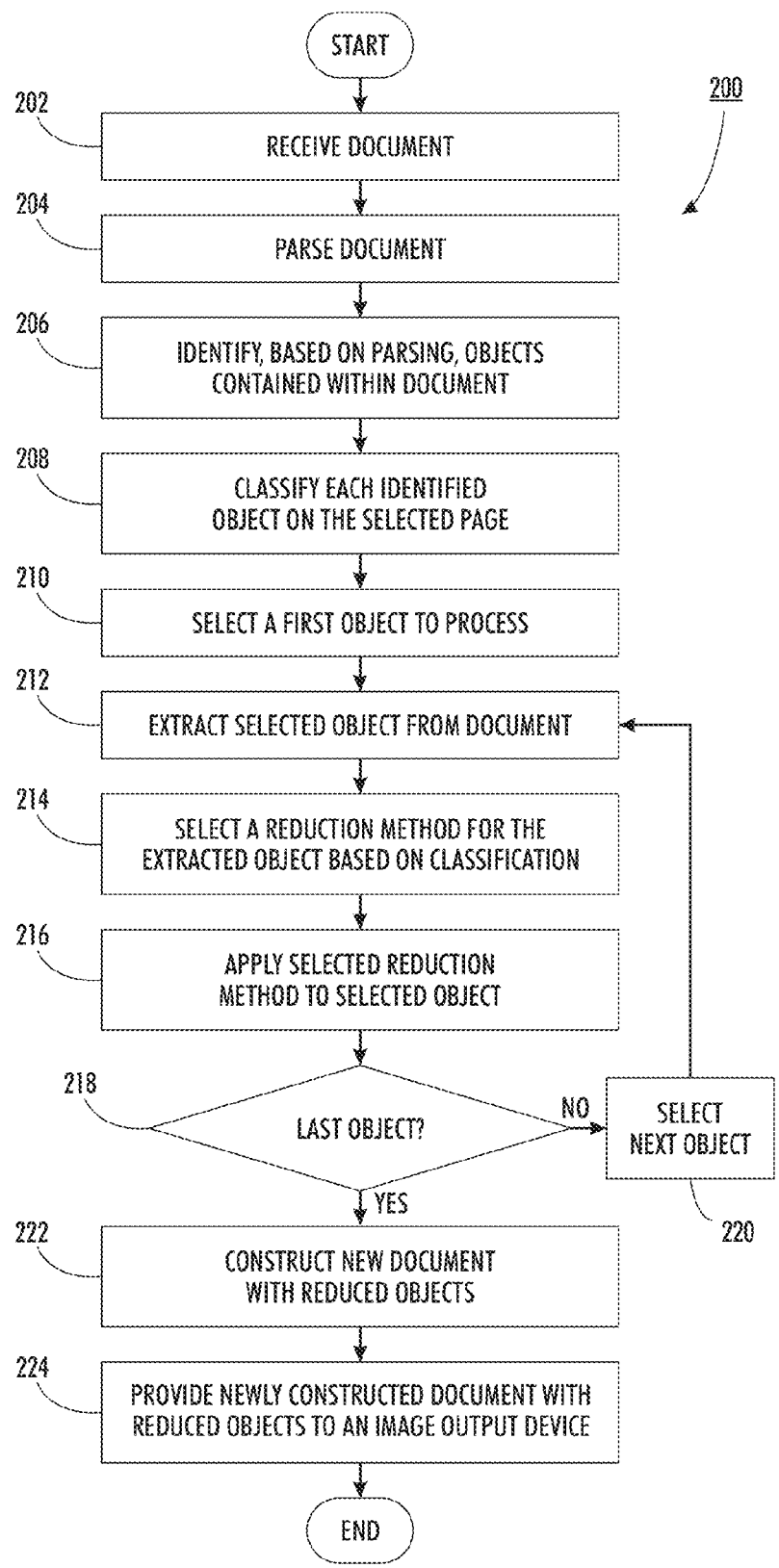
FIG. 2 is a processing flow diagram of one example embodiment of the present adaptive document resizing method.

Reference is now made to FIG. 2, which is a processing flow diagram of a further embodiment of the present document reduction method 200 to reduce the size of image object within a document.

At 202, a document is received using an image input device. Multi-page documents can also be received. The document can be retrieved from a data storage device or by scanning a printed document with a scanner such as document scanner 122 of FIG. 1. The document can also be received over a network from a remote device, such as a workstation or a server, placed in communication with the document processing system wherein the present adaptive resizing method is employed.

At 204, the document is parsed to identify features located in the document to support identifying image objects in the document. In one embodiment, parsing of the document to identify features is performed using conventional techniques.

At 206, objects in the document are identified based upon the features determined from parsing the document. At 208, the identified objects are classified according to object type, as is described in further detail below. Examples of object types into which identified objects are able to be classified include, for example, Text, graphics, and background.

At 212, the selected object is extracted from the document. At 214, a reduction method is selected for the selected object based upon the classification of that object. At 216, the selected reduction method is applied to that object.

At 218, a determination is made if the currently selected object is the last object identified in the document to be processed. If the currently selected object is not the last object identified in the document, at 220 a next identified object is selected to be processed. The method then returns to extracting, at 212, the newly selected object from the document and processes that object as described above.

If it is determined that the currently selected object is the last object identified in the document to be processed, at 222, a new document is constructed with the reduced objects produced by applying the selected reduction technique to each object. In one embodiment, the selected reduction technique is able to be different for each identified object in the document and is selected based upon the classification of the object.

Once the new document is constructed, at 224, the newly constructed document is provided, with the reduced objects, to an image output device. The processing then ends.

Figure 3:
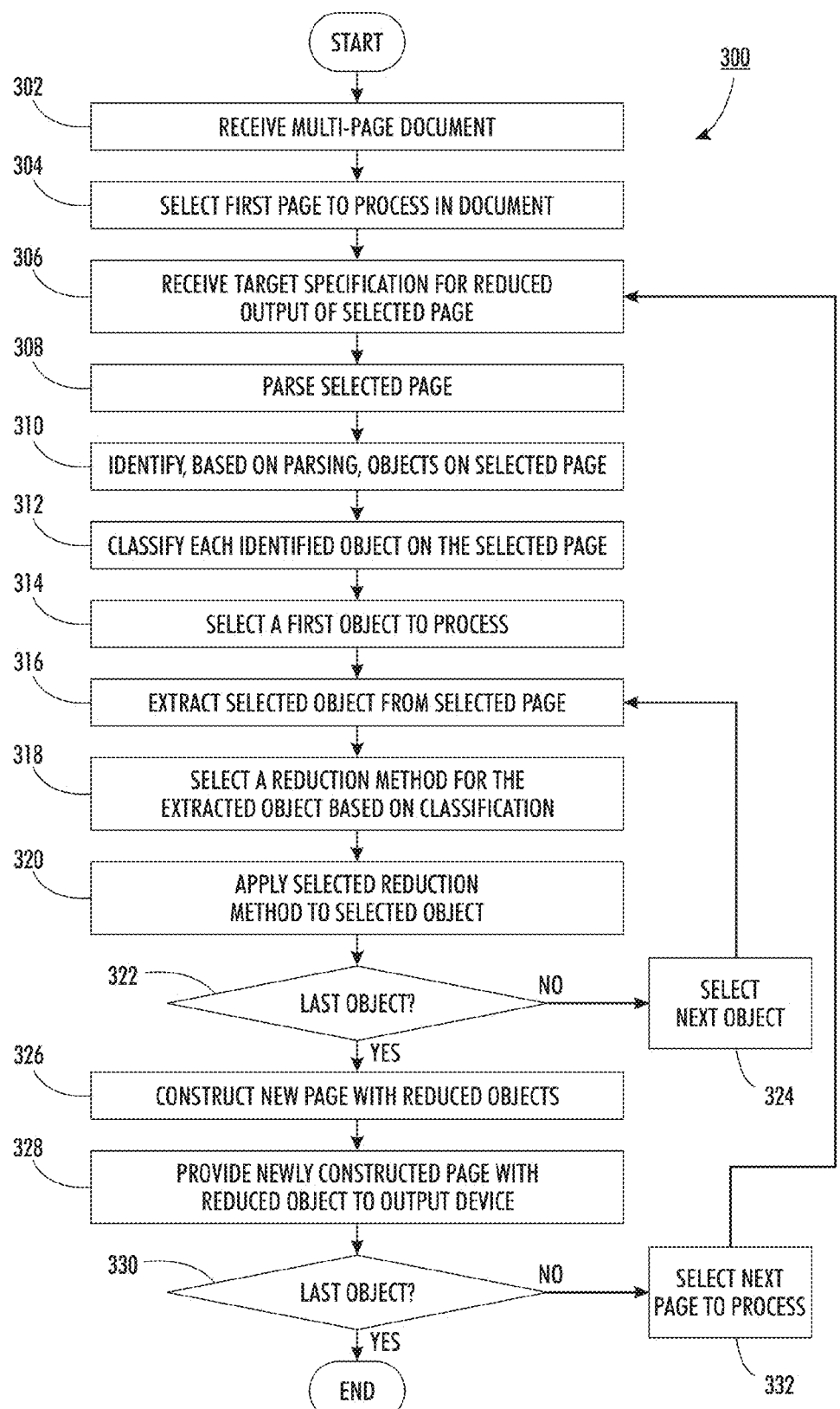
FIG. 3 is a processing flow diagram of a further example embodiment of the present adaptive document resizing method.

Reference is now made to FIG. 3, which is a processing flow diagram of a further embodiment of the present document reduction method 300 that is used to reduce the image sizes of each page within multiple page documents.

At 302, a multi-page document is received using an image input device. The multi-page document can be retrieved from a data storage device or by scanning a printed document with a scanner such as document scanner 122 of FIG. 1. The multi-page document can also be received over a network from a remote device, such as a workstation or a server, placed in communication with the document processing system wherein the present adaptive resizing method is employed.

At 304, a page of the received multi-page document is selected to be processed. Selection may take the form of a user choosing a first page to be processed in accordance herewith using a graphical user interface associated with the digital imaging system whereon the present document reduction method is implemented. Alternatively, the first page of the received multi-page document is determined based upon the order in which the pages of the document were received.

At 306, a target specification for reduced output of the selected page is obtained. In various embodiments, target specifications are able to be provided that include, for example, a specification of the resolution/available pixel count and/or the total size of each page to be displayed on the image output device 150 or print engine 140. At 308, the selected page is parsed to identify features located on the page to support identifying image objects on the page. As described above with regards to parsing in step 204 of FIG. 2, parsing of the page to identify features is performed using conventional techniques.

At 310, objects on the selected page are identified based upon the features determined from parsing the page. At 312, the identified objects are classified according to object type, as is described in further detail below. Examples of object types into which identified objects are able to be classified include, for example, Text, graphics, and background. The identification and classification of steps 310 and 312 are similar to those discussed above with regards to 206 and 208 of FIG. 2.

Once the objects on a page are identified and classified, at 314 a first object is selected to be processed.

Similarly to the processing discussed above at 212 and 214 of FIG. 2, at 316, the selected object is extracted from the page and a reduction method is selected, at 318, for the selected object based upon the classification of that object. At 320, the selected reduction method is applied to that object. Applying the reduction method is similar to the processing described above at 216 of FIG. 2.

At 322, a determination is made if the currently selected object is the last object identified on the currently selected page to be processed. If the currently selected object is not the last object identified on the currently selected page, at 324 a next identified object is selected to be processed. The method then returns to extracting, at 316, the newly selected object from the page and processes that object as described above.

If it is determined that the currently selected object is the last object identified on the page to be processed, at 326, a new page is constructed with the reduced objects produced by applying the selected reduction technique to each object. In one embodiment, the selected reduction technique is able to be different for each identified object on a page and is selected based upon the classification of the object.

Once the new page is constructed, at 328, the newly constructed page is provided, with the reduced objects, to an output device. At 330, a determination is made if the currently selected page is the last page of the received multi-page document to be processed. If the selected page is determined to not be the last page to process, at 332 a next page to process is selected from within the received multi-page document. The method then returns to receiving, at 306, target specifications for the reduced output of the selected page. The target specifications for each page of the received multi-page document in one embodiment is able to differ for each page or a common target specification is able to be used for multiple pages or even all pages of the received multi-page document. If the currently selected page was determined to be the last page to be processed, the processing then ends.

Document Reduction Processing Framework

Figure 4:
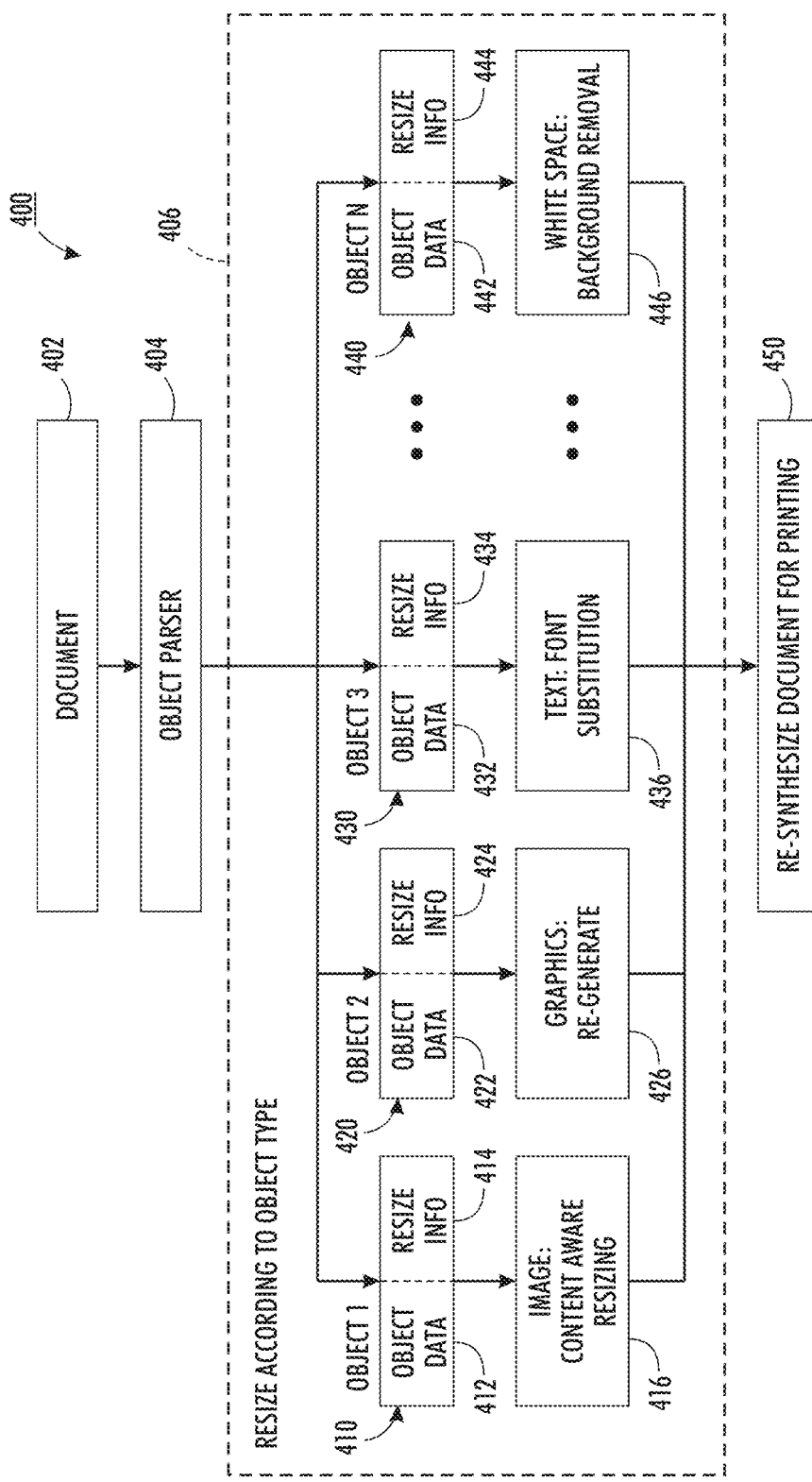
FIG. 4 is an example document reduction processing framework for the present adaptive document resizing method.

Reference is now made to FIG. 4, which illustrates a document reduction processing framework 400 according to one embodiment of the present method. The document reduction processing framework 400 includes a document 402 that is to be reduced. Document 402 is generally received from a suitable source. The document 402 is then processed by an object parser 404. Object parser identifies and extracts objects within each page of the document 402 and classifies each identified object according types of objects that are most effectively processed by respective resizing techniques. Each object is then reduced according to a rule-based set of guidelines as is described below.

The objects identified and extracted by object parser 404 are then processed by different resizing processing algorithms that are selected based upon the classification of the object according to a rule-based set of guidelines. In the example of the document reduction processing framework 400, a first object, Object 1 410, is classified as an image object by the object parser 404. Object 1 410, which includes object data 412 and resizing information 414, is processed, according to an example rule-based set of guidelines, by a content aware resizing technique 416 that is designed to best reduce image type objects. Similarly, a second object, Object 2 420, is classified as a graphics object by the object parser 404. Object 2 420, which includes object data 422 and resizing information 424, is processed, according to an example rule-based set of guidelines, by a regenerating resizing technique 426 based upon, for example, graphic object resolution, that is designed to best reduce graphics type objects. A third object, Object 3 430, is classified as a text object by the object parser 404. Object 3 430, which includes object data 432 and resizing information 434, is processed, according to an example rule-based set of guidelines, by a font substitution resizing technique 436 that is designed to best reduce text type objects. An nth object, Object N 440, is classified as a whitespace object by the object parser 404. Object N 440, which includes object data 442 and resizing information 444, is processed, according to an example rule-based set of guidelines, by a whitespace resizing technique 446 that removes page background data. The whitespace resizing technique 446 is designed to best reduce whitespace type objects.

Figure 5:
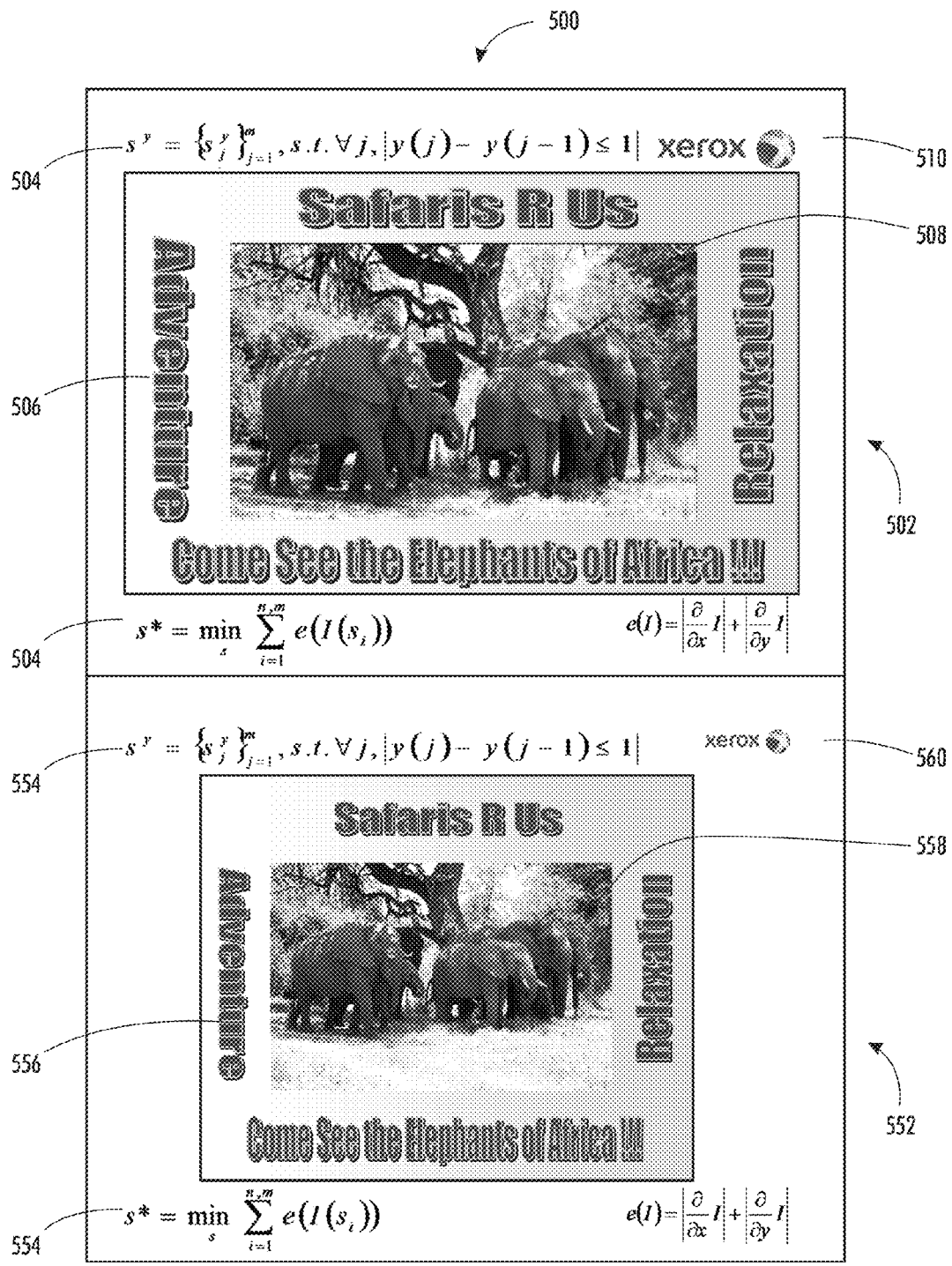
FIG. 5 illustrates two reduced images of a page including an image reduced by the present method and an image reduced by conventional methods.

Reference is now made to FIG. 5 which illustrates two reduced images 500 of an example page of a document. The two reduced images are presented as a "2-up" presentation, which generally refers to a page that includes images of two pages. As is familiar to practitioners of the relevant arts, such "2-up" presentations are used to generate smaller handouts of presentation materials where 2 presentation slides are printed on a single page. In the two reduced images, the same page is presented in the top half as a first reduced image 502, which is reduced by the present method, and the same page is presented in the bottom half as a second reduced image 552, which is reduced by conventional methods. The first reduced image text 506 and the first reduced image 508 have been elongated to more completely fill the available area of the first reduced image. The first reduced logo 510 is reduced less than the image components to provide a more striking presentation in the first reduced image. Furthermore, the first reduced image has the first reduced equation text 504 reduced by less than the first reduced image text 506 and the first reduced image 508. In contrast, the second reduced image has been reduced by conventional methods that maintain a constant reduction factor for the entire page. The second reduced equation text 554 is reduced from the original image by as much as the second reduced image text 556, the second reduced image 558, and the second reduced logo 560.

Various Other Embodiments

Figure 6:
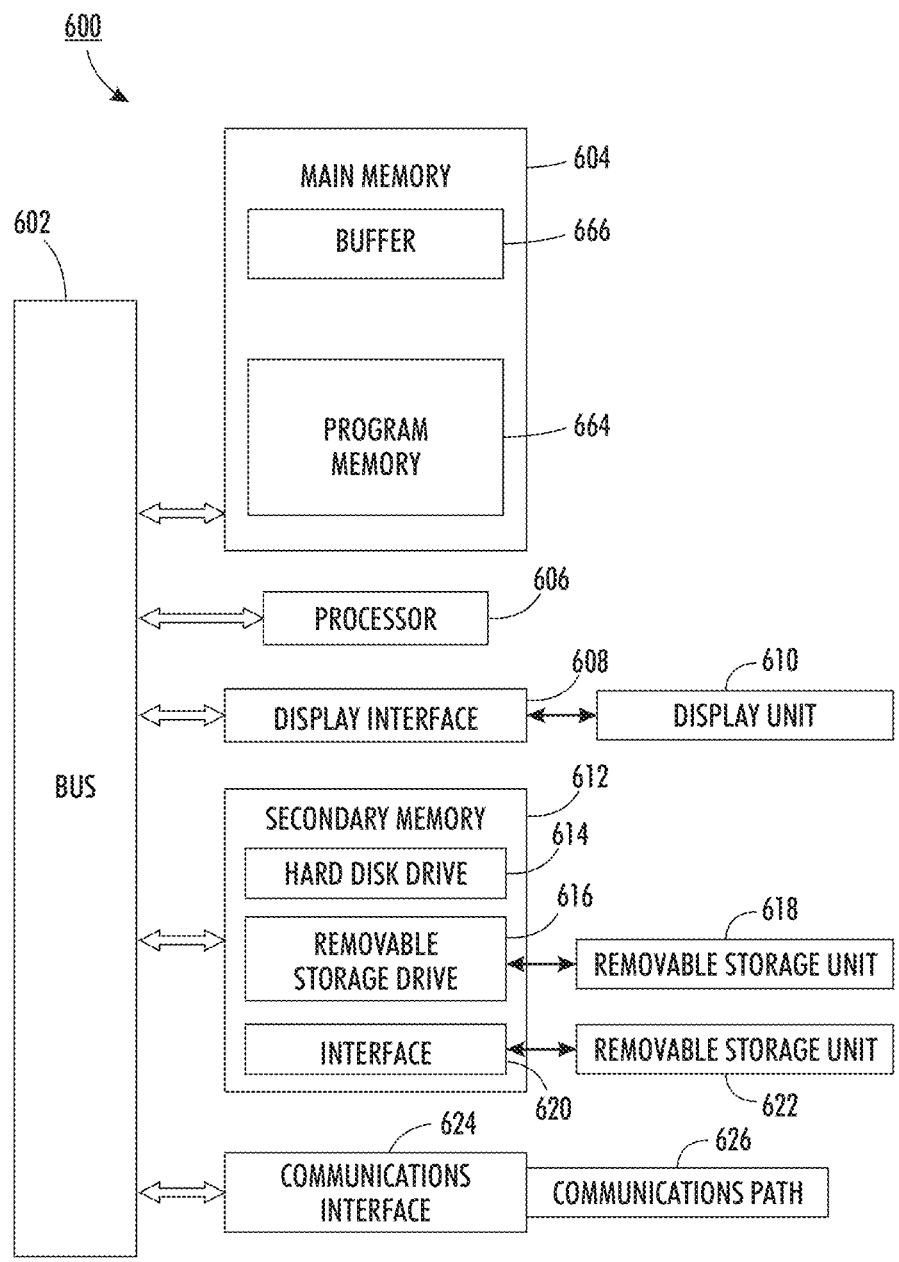
FIG. 6 is a block diagram of one example embodiment of a special purpose computer useful for implementing one or more aspects of the present document resizing method.

Reference is now made to FIG. 6 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the present method as described in the flow diagram of FIGS. 2 and 3 and the processing framework of FIG. 4.

Special purpose computer system 600 includes processor 606 for executing machine executable program instructions for carrying out all or some of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores machine readable instructions for performing the present method. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 may further include other mechanisms for allowing programs and/or machine executable instructions to be loaded onto the processor. Such mechanisms may include, for example, a storage unit 622 adapted to exchange data through interface 620 which enables the transfer of software and data. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for per-page object-based resizing of a multi-page document, the method comprising:
receiving a multi-page document containing at least a text object, a graphic object, and a background object; and
for each document page of the multi-page document:
receiving a target specification for target size, each of said pre-selected reduction methods being capable of resizing respective objects by an amount which meets said target specification;
parsing an original image of said document page using a software document page parser;
utilizing information obtained from said document page parser to identify objects contained within said document page;
classifying said identified objects by object type, said object types being one of: a text object, a graphic object, an image object, and a whitespace/background object;
for each object type identified within said document page:
extracting said identified object from said document page;
in response to said extracted object being classified as a text object, resizing font within said text object;
in response to said extracted object being classified as a graphic object, resizing said graphic object using isomorphic scaling;
in response to said extracted object being classified as an image object, resizing said image object using content aware resizing; and
in response to said extracted object being classified as a whitespace/background object, resizing said whitespace/background object using background removal;
constructing a new document page using said resized objects, said new document page comprising a resized image of said original image of said document page, said resized extracted objects being arranged in said original layout within said resized image; and
providing said new document page to an output device for rendering.

2. The method of claim 1, wherein selecting a reduction method further comprises prioritizing reduction of said extracted object based upon a rule-based set of guidelines and target specifications for target size and output device resolution.

3. The method of claim 1, wherein classifying said identified objects by object type, includes classifying said identified objects as whitespace object and
in response to said extracted object being classified as a whitespace object, removing background data.

4. The method of claim 1, wherein said reduction method is pre-selected for a given object type based upon respective abilities of said reduction method to reduce a given object type.

5. The method of claim 1, further comprising using local and global context of said document to target different sizes of objects for reduction.

6. A system for per-page object-based resizing of a multi-page document, the system comprising:
a memory;
a storage medium for storing data; and
a processor in communication with said storage medium and said memory, said processor executing machine readable instructions for performing the method of:
receiving a multi-page document containing at least a text object, a graphic object, and a background object; and
for each document page of the multi-page document:
receiving a target specification for target size and output device resolution, each of said pre-selected reduction methods being capable of resizing respective objects by an amount which meets said target specification;
parsing an original image of said document page using a software document page parser;
utilizing information obtained from said document page parser to identify objects contained within said document page;
classifying said identified objects by object type, said object types being one of: a text object, a graphic object, an image object, and a whitespace/background object;
for each object type identified within said document page:
extracting said identified object from said document page;
in response to said extracted object being classified as a text object, resizing font within said text object;

in response to said extracted object being classified as a graphic object, resizing said graphic object using isomorphic scaling;

in response to said extracted object being classified as an image object, resizing said image object using content aware resizing; and in response to said extracted object being classified as a whitespace/background object, resizing said whitespace/background object using background removal;

constructing a new document page using said resized objects, said new document page comprising a resized image of said original image of said document page, said resized extracted objects being arranged in said original layout within said resized image; and providing said new document page to an output device for rendering.

7. The system of claim 6, wherein selecting a reduction method comprises prioritizing reduction of said extracted object based upon a rule-based set of guidelines.

8. The system of claim 6, wherein said reduction method is pre-selected for a given object type based upon respective abilities of said reduction method to reduce a given object type.

9. The system of claim 6, the method further comprising using local and global context of said document to target different sizes of objects for reduction.

* * * * *